US010170004B2

(12) United States Patent
Hubbard et al.

(10) Patent No.: US 10,170,004 B2
(45) Date of Patent: Jan. 1, 2019

(54) FLEET MANAGER BASED VEHICLE CONTROL

(71) Applicant: SPEEDGAUGE, INC., San Francisco, CA (US)

(72) Inventors: Jonathan Hubbard, San Francisco, CA (US); Christopher A. Kantarjiev, Palo Alto, CA (US)

(73) Assignee: SPEEDGAUGE, INC., San Francisco, CA (US)

(*) Notice: Subject to any disclaimer, the term of this patent is extended or adjusted under 35 U.S.C. 154(b) by 81 days.

(21) Appl. No.: 15/333,796

(22) Filed: Oct. 25, 2016

(65) Prior Publication Data

US 2017/0076609 A1 Mar. 16, 2017

Related U.S. Application Data

(63) Continuation of application No. 14/602,130, filed on Jan. 21, 2015, now Pat. No. 9,478,074.

(60) Provisional application No. 61/929,955, filed on Jan. 21, 2014.

(51) Int. Cl.

| G08G 1/00 | (2006.01) |
|---|---|
| G07C 5/00 | (2006.01) |
| B60W 50/14 | (2012.01) |
| G06K 9/00 | (2006.01) |
| G08G 1/052 | (2006.01) |
| G08G 1/0962 | (2006.01) |
| G08G 1/0967 | (2006.01) |
| G08G 1/0968 | (2006.01) |

(52) U.S. Cl.
CPC ............ *G08G 1/207* (2013.01); *B60W 50/14* (2013.01); *G06K 9/00845* (2013.01); *G07C 5/008* (2013.01); *G08G 1/052* (2013.01); *G08G 1/09626* (2013.01); *G08G 1/096775* (2013.01); *G08G 1/096827* (2013.01); *B60W 2050/143* (2013.01); *B60W 2520/10* (2013.01); *B60W 2550/14* (2013.01)

(58) Field of Classification Search
CPC ............. B60R 25/209; B60H 1/00771; B60H 1/00657
See application file for complete search history.

(56) References Cited

U.S. PATENT DOCUMENTS

| 9,478,074 B2 | 10/2016 | Hubbard | |
|---|---|---|---|
| 2007/0005233 A1* | 1/2007 | Pinkus | G01C 21/362 701/416 |
| 2009/0210302 A1* | 8/2009 | Tashev | G06Q 10/047 705/14.69 |

(Continued)

OTHER PUBLICATIONS

U.S. Appl. No. 14/602,130 Final Office Action dated Mar. 8, 2016.
U.S. Appl. No. 14/602,130 Office Action dated Oct. 1, 2015.

*Primary Examiner* — Hussein Elchanti
(74) *Attorney, Agent, or Firm* — Polsinelli LLP

(57) ABSTRACT

A fleet manager may communicate desired driving behavior, including maximum speed, desired route, areas to avoid, and other information to operators of vehicles in the fleet. The communication may be via an application on a mobile device, vehicle computer, or other device associated with each driver or vehicle. In operation, an administrator, such as, for example, a fleet manager, may communicate instructions to one or more vehicles, for example a vehicle of a fleet of vehicles.

15 Claims, 6 Drawing Sheets

(56) References Cited

U.S. PATENT DOCUMENTS

| | | |
|---|---|---|
| 2009/0287408 A1 | 11/2009 | Gerdes et al. |
| 2010/0045451 A1 | 2/2010 | Periwal |
| 2010/0205012 A1 | 8/2010 | McClellan |
| 2010/0235046 A1 | 9/2010 | Proefke et al. |
| 2011/0074561 A1 | 3/2011 | Macjust et al. |
| 2011/0112969 A1* | 5/2011 | Zaid ................ G06Q 10/02 705/50 |
| 2011/0175751 A1* | 7/2011 | Khachaturian .... G01C 21/3697 340/905 |
| 2011/0208646 A1* | 8/2011 | McMaster ............ G06Q 20/10 705/39 |
| 2011/0256904 A1 | 10/2011 | Simmons |
| 2013/0061621 A1 | 3/2013 | Nielsen |
| 2013/0151132 A1 | 6/2013 | Harumoto et al. |
| 2013/0179027 A1 | 7/2013 | Mitchell |
| 2014/0200742 A1 | 7/2014 | Mauti |
| 2014/0229255 A1 | 8/2014 | Scofield et al. |

* cited by examiner

FLEET MANAGER BASED VEHICLE CONTROL

CROSS-REFERENCE TO RELATED APPLICATIONS

The present application is a continuation and claims the priority benefit of U.S. patent application Ser. No. 14/602, 130, issuing as U.S. Pat. No. 9,478,074, which claims the priority benefit of U.S. provisional application No. 61/929, 955 filed Jan. 21, 2014, the disclosures of which are incorporated herein by reference.

BACKGROUND OF THE INVENTION

Field of the Invention

The present invention generally pertains to fleet management. More specifically, the present invention pertains to fleet manager based control of vehicles utilizing GPS and mobile devices.

Description of the Related Art

Positioning systems such as Global Positioning System (GPS) have many applications. One such application is determining the position of a vehicle. Some vehicles have GPS to assist the driver determine where they are and help them get to a destination.

Businesses that require use of one or more vehicles ("fleets") often have rules and preferences regarding how and where vehicles may be driven. Some fleet vehicles may be equipped with GPS components to allow for GPS tracking capability. But even with such capabilities, a fleet having only GPS monitoring will do nothing more but indicate to a fleet manager where a particular vehicle is at any given time. It is difficult to determine whether a vehicle operator is operating a vehicle or otherwise driving in a safe manner based solely on GPS generated information.

There is a need in the art for an improved methodology for monitoring the driving habits of the operators of fleet managed vehicles. There is a further need to determine whether these driving habit constitute safe operation thereby alleviating a fleet from potential liability or other costs associated with unsafe driving.

SUMMARY OF THE PRESENTLY CLAIMED INVENTION

An embodiment of the presently claimed invention includes sending a message to a remote device, the message including a request for operation of a vehicle. Position data for the vehicle is captured after sending the message whereby a determining is made as to whether the vehicle has complied with the request based on the position data.

DETAILED DESCRIPTION OF THE INVENTION

Figure 1:
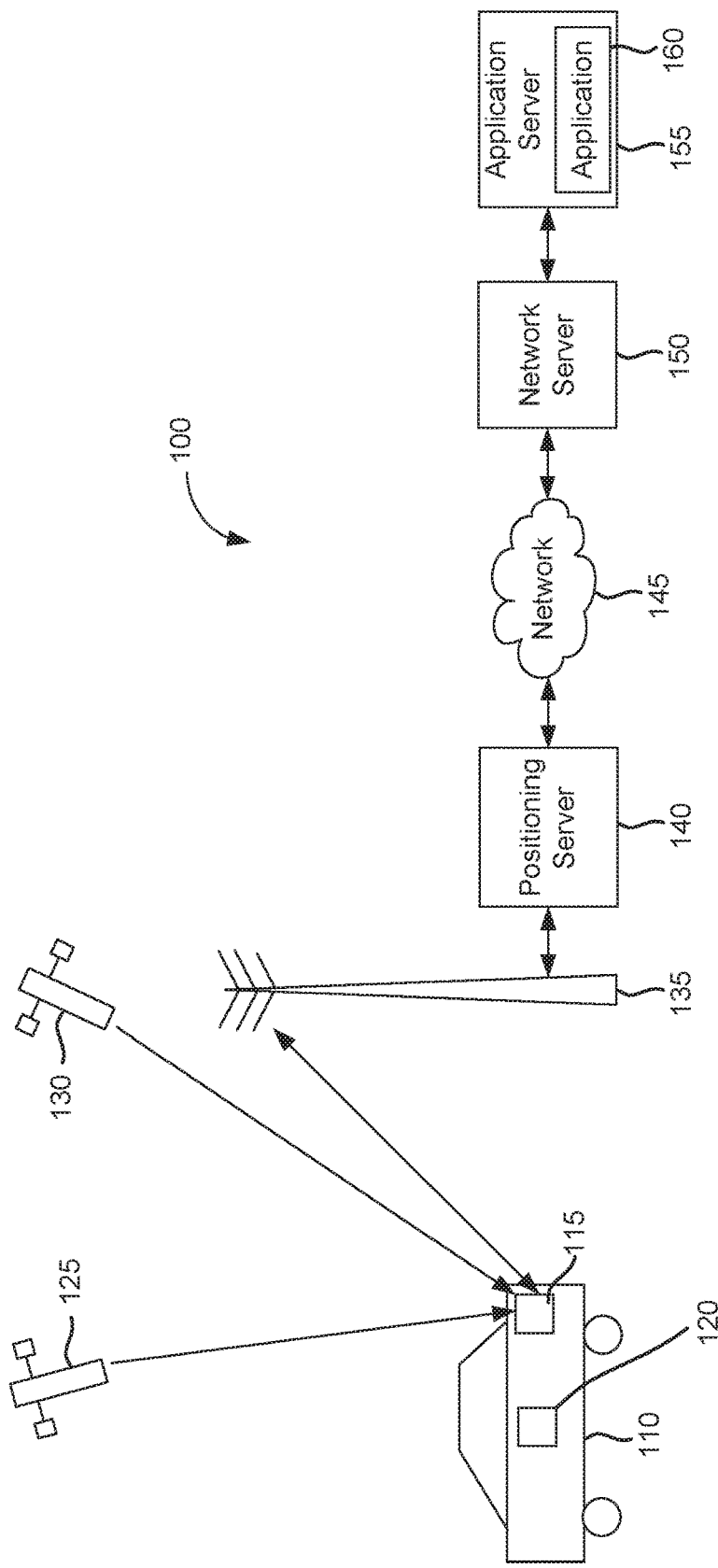
FIG. 1 illustrates a system for tracking a vehicle.

A fleet manager may communicate desired driving behavior, including maximum speed, desired route, areas to avoid, and other information to operators of vehicles in the fleet. The communication may be via an application on a mobile device, vehicle computer, or other device associated with each driver or vehicle. In operation, an administrator, such as, for example, a fleet manager, may communicate instructions to one or more vehicles, for example a vehicle of a fleet of vehicles.

The instructions may request that the operator of the vehicle exhibit a particular behavior with respect to the vehicle. Examples of a particular behavior may include drive slower than a particular speed (e.g., don't drive faster than 45 MPH in a 50 MPH zone), stay at least 500 meters away from a location such as a school, take a particular route, or other behavior. The instructions may be provided as a message provided through a mobile device application, a message provided through a vehicle computing system, or other mechanism.

The adherence of a vehicle operator to such instructions may be determined. GPS data may be collected from the vehicle associated with the received instructions. The collected GPS data may be received by an application server. The speed, driving habits and location of vehicles within a fleet that received instructions may be determined by the application server. For example, the GPS data processed by the application server may reveal if a vehicle is complying with instructions to travel slower than a particular speed, stay at least 500 meters away from a location, take a particular route, or other instruction regarding operating the vehicle.

If the detected vehicle behavior does not comply with the instructions, an alert may be generated and transmitted to an administrator, the driver of the vehicle, and other recipients regarding the vehicle and/or driver behavior. Vehicle operator compliance with instructions may be stored for purposes of reporting a historical record of compliance over time. In some embodiments, the compliance may be determined by a post-processing step or real-time feedback.

Driving behavior may be analyzed based on other vehicles in proximity to the user vehicle. GPS data collected from the user vehicle and other vehicles may be received by an application server. The speed of vehicles within a geographical area may then be determined. The geographical area may be selected based on available data, input received by an administrator, the location of a particular vehicle, or in some other manner. A determination is made as to whether the vehicle in the geographical area is exhibiting aberrant behavior. The aberrant behavior may be determined in view of other vehicles in the geographical area. If aberrant behavior is detected, an alert may be generated and transmitted to an administrator.

In some embodiments, a fleet manager or other user may interact with an application or website to specify a desired driving behavior or conditions for one or more vehicles. An application executing on an application server may then process the desired behaviors into conditions and geographies, which may be stored and communicated to a device associated with a vehicle subject to the desired driving behavior. The device may then monitor the behavior against the set of conditions. In this model, it would be possible to have alerts in the vehicle at the time of a violation of the behavior or conditions. It may not be necessary to communicate anything to the vehicle. Rather, the compliance can be determined after the trip, based on the GPS data that has been collected from the vehicle.

FIG. 1 illustrates a system for tracking a vehicle. The system of FIG. 1 includes vehicle 110, positioning satellites 125 and 130, communications tower 135, positioning server 140, network 145, network server 150 and application server 155.

Vehicle 110 may be any vehicle that travels on roads, highways, waterways, or other throughways. A road may include a public road, private road, highway, freeway, residential street, driveway, or other thoroughfare on which a vehicle may travel. The vehicle may be an automobile, shipping truck, motorized cycle, or some other vehicle.

The vehicle may include a positioning device 115 that communicates with satellite systems 125 and 130, possible wireless or cellular communication systems, and mobile device 120. Positioning device 115 may receive signals from one or more positioning satellites 125 and 130 and determine its location based on the received signals. The positioning satellites may be part of a global, national or local positioning system. For example, the positioning satellites may be part of the Global Positioning System (GPS), and the positioning device may be a GPS device. As a GPS device, positioning device 115 may receive a signal from multiple GPS satellites, process the signals to determine a location for each satellite, and determine a location for itself (and therefore the vehicle).

Positioning device 115 may communicate the positioning data in position coordinates (e.g., GPS coordinates), identification data and other data via cellular communication with communications tower 135, which may support cellular and/or wireless communications by way of communicative coupling to a larger communications network. Positioning device 115 may communicate via a wired connection, wireless connect (e.g., a radio frequency connection), or both. Positioning device 115 may be attached to a vehicle 110, a device within vehicle 110 but associated with a user (e.g., a mobile phone 120), or some other device capable of communicating over a cellular or wireless communications network. In some embodiments, the device may also implement GPS in an in-cab computer, as an add-on to a computer, connected to a computer via USB or Bluetooth, or in communication with a computer via other communication mechanism.

Mobile device 120 may communicate with application server 150 via at least communications tower 135 and network 145. Mobile device 120 may be implemented as a smart phone, a tablet computer, a computing device integrated into vehicle 110, or some other device. Mobile device may include one or more components or functionalities described in the context of FIG. 6. Mobile device 120 may include one or more mobile applications able to communicate with application 160 hosted by application server 155. An administrator of a vehicle service business may communicate with the operator of vehicle 110 by communicating messages between application 160 and an application on mobile device 120. Mobile device 120 is discussed in further detail below with respect to FIG. 2B.

Communications tower 135 may communicate the location information received for vehicle 110 to positioning server 140, which may be a GPS server. Though cellular and wireless networks and communication systems are discussed herein, other communication networks may be used to communicate the GPS and identity data to an application, such as but not include satellite communication technology.

Network server 150 may communicate with positioning server 140 through network 145 and with application server 155. Network server 150 may be implemented as one or more servers implementing a network service. The network server may receive positioning data, perform preliminary processing on the data, and provide the positioning data to application server 155. Positioning server 140, network server 150, and application server 155 may be implemented using a computing device like that discussed below with respect to FIG. 5.

Network 145 may facilitate communication of data between different servers, devices and machines, such as positioning server 140, network server 150, and application server 155. The network may be implemented, for example, as a private network, public network, intranet, the Internet, a wide area network, a local area network, or a combination of these networks.

Application server 155 may be implemented as one or more servers, includes application 160 and may communicate with network server 150 and other devices (not illustrated in FIG. 1). Application 160 may receive positioning data associated with positioning device 115 and received from network server 150, process the positioning data along with geo-data, and identify vehicle behavior related to other vehicles. A method for determining the accuracy information is discussed in more detail below with respect to FIG. 2A.

Figure 2A:
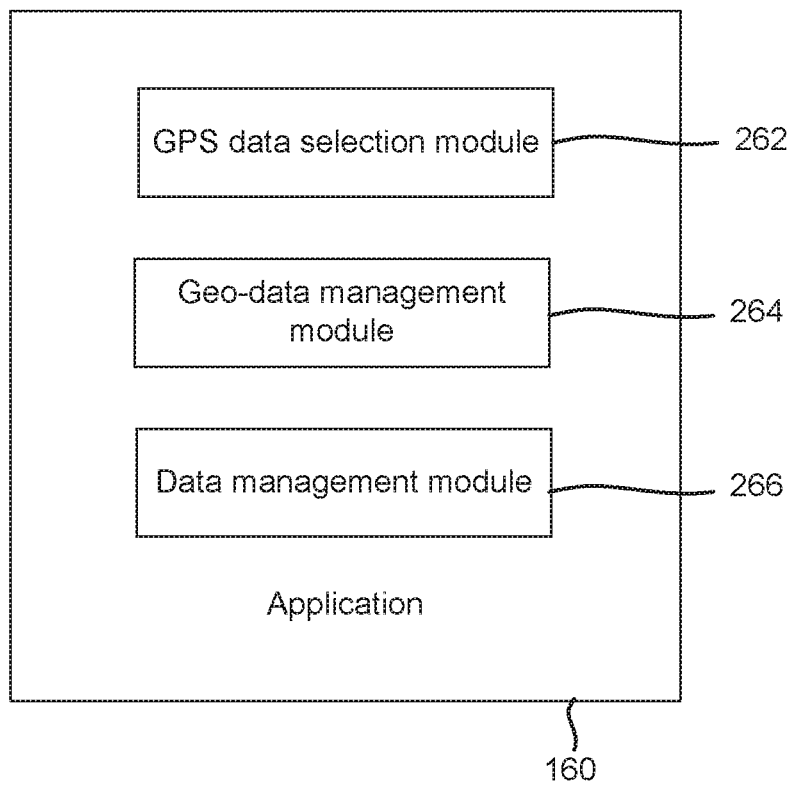
FIG. 2A illustrates an application for processing GPS data and communicating with a remote device.
Figure 2B:
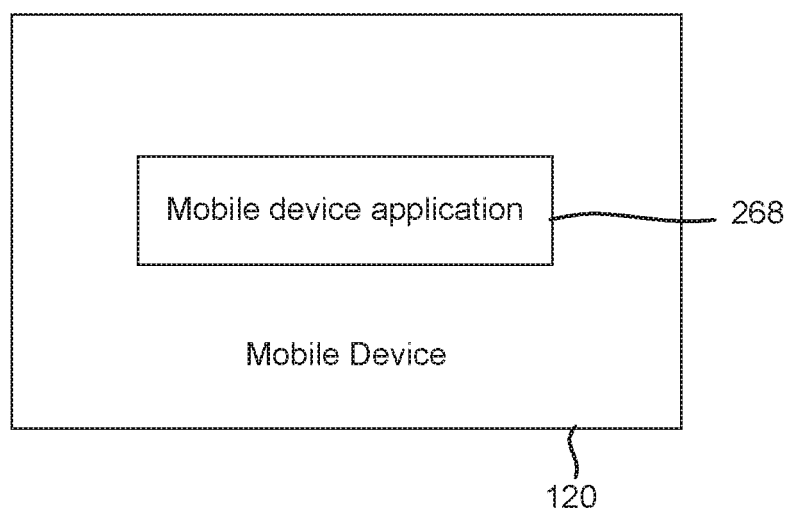
FIG. 2B illustrates a mobile device with an application for communicating with a remote server.

FIGS. 2A and 2B are discussed with reference to a GPS system. It is intended that the reference to a GPS system is for discussion purposes only, and that other positioning systems can be used with the present technology.

FIG. 2A illustrates an application for processing GPS data and communicating with a remote device. The application of FIG. 2A may provide more detail for application 160 of FIG. 1. Application 160 may include a GPS data selection module 262, geo-data management module 264, and data management module 266. The GPS data selection module 262 is stored in memory and may be executed to receive GPS data from multiple vehicles via positional server 140, and perform GPS data management functions. Geo-Data Management Module 264 is stored in memory and may be executed to access and process geo-data for comparison and processing along with GPS data, as well as perform other data management functions for the geo-data.

Data Management module 266 is stored in memory and may be executed to compare selected GPS data to determine behavior of a particular vehicle over time. Data management module 266 may also generate messages based on administrator input, send and receive messages and other communications with mobile device 120, determine if vehicle behavior is complying with a request made in a message sent to mobile device associated with the vehicle or vehicle operator, and other functionality described herein.

It is intended that each of modules 262, 264, and 266 may include one or more further software modules, which may be combined into fewer software modules but nevertheless remain operable and functional as to determine the accuracy of a positioning device 115. The modules may be stored and executed on application server 155, on a mobile device, or distributed over several computing devices (servers, mobile devices, and so forth).

FIG. 2B illustrates a mobile device 120 with an application for communicating with a remote server. Mobile device 120, as noted above, may include one or more components as illustrated and described in the context of FIG. 6. Mobile device 120 may communicate with application server 150 via at least communications tower 135 and network 145 and may include mobile device application 268. Mobile device application 268 may execute on mobile device 120 to exchange messages and other communications with application server 155, output messages in the form of text, graphical data, audio and video through mobile device output devices, receive input from an operator of vehicle 110, and transmit messages and other data, based on vehicle operator input and other sources, to application 160.

Figure 3:
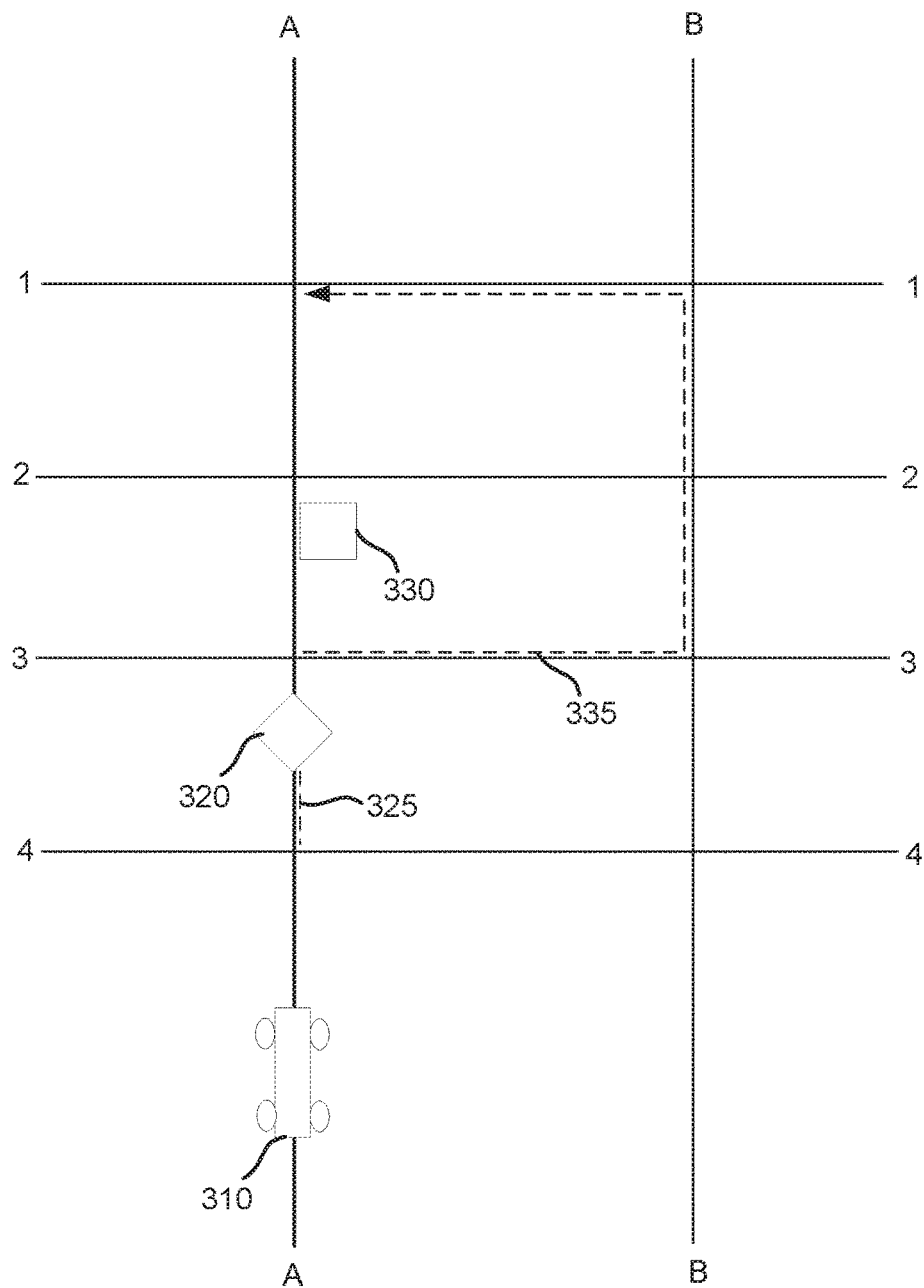
FIG. 3 illustrates a vehicle within an geographical area.

FIG. 3 illustrates a vehicle within an geographical area. The geographical area of FIG. 3 includes a roads A, B, 1, 2, 3, and 4, vehicle 310, road condition 320, and structure 330. Roads A and B may be parallel to each other and perpendicular to roads 1, 2, 3 and 4 (though any configuration of roads may be suitable for use of the present technology). Vehicle 310 may be a vehicle in a fleet of vehicles and traveling along road A in the direction of road 4 towards road 1. Road condition 320 along road A may be known to an administrator of the fleet. The administrator may send a message associated with a fleet vehicle such as vehicle 310, for example to a mobile device application associated with the vehicle operator's mobile device, to not exceed a certain speed along portion 325 of roadway A.

An administrator may also send a message to one or more vehicles to avoid coming within a certain distance of structure 330. For example, structure 330 may be a school, a power plant, or some other structure of significance or value. If vehicle 310 includes unstable material, prisoner transport, or some other cargo associated with risk, it may be appropriate to route vehicle 310 away from structure 330. As such, an administrator may direct vehicles of the fleet to travel along route 335 away from the structure.

Figure 4:
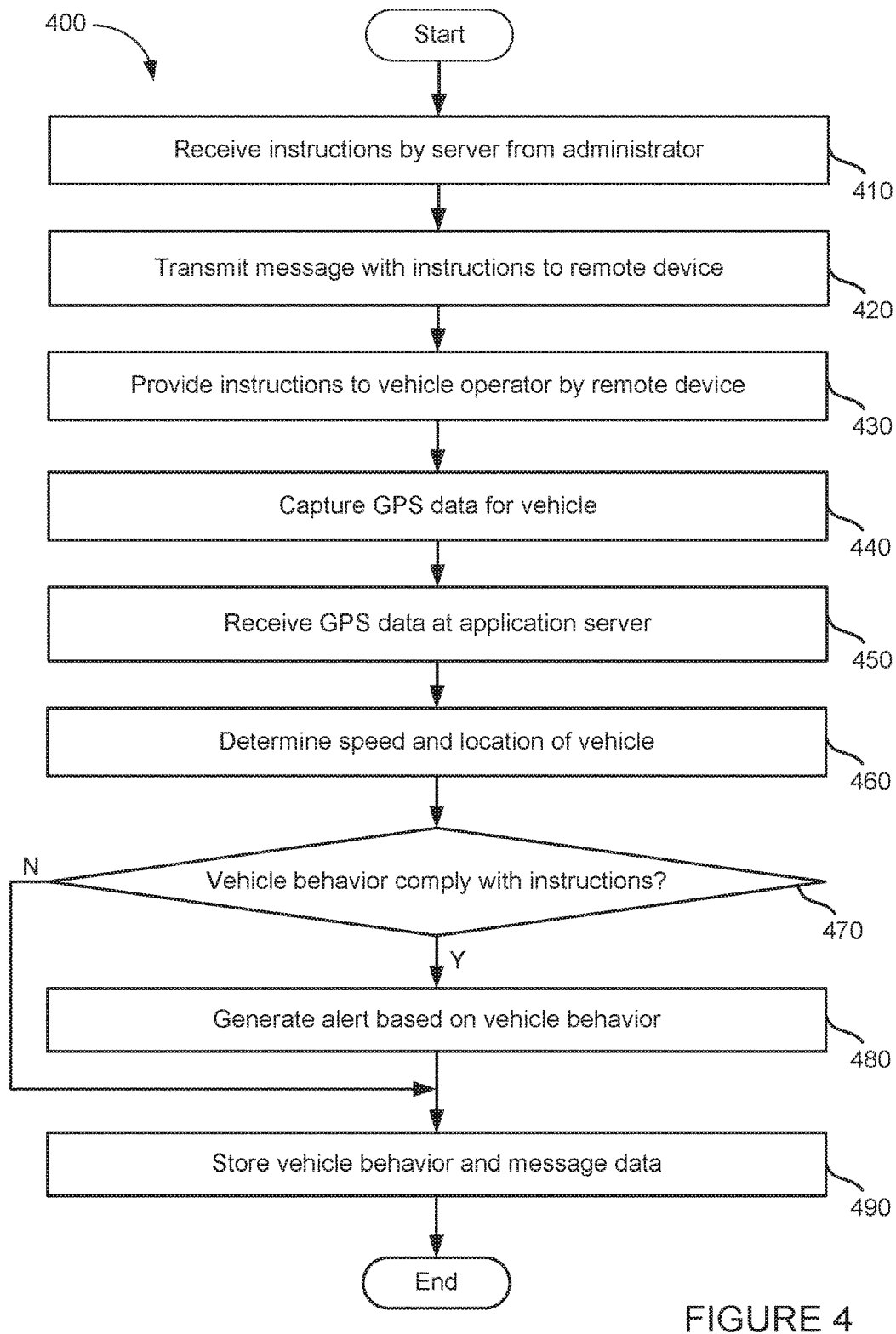
FIG. 4 illustrates a method for fleet manager based vehicle control.

FIG. 4 illustrates a method for fleet manager based vehicle control. The method of FIG. 4 begins with receiving instructions by a server from an administrator at step 410. The instructions may include a request for operating a vehicle, such as not exceeding a maximum speed, taking the vehicle along a route, or some other request.

A message may be transmitted with the instructions to the remote device at step 420. The message may be transmitted as video file, audio file, image data, textual data, an SMS message, email, or other data. The message may be transmitted by an application of application server 155 and be received by mobile device 120 of FIG. 1.

Instructions may be provided to the vehicle operator by the remote device at step 430. The instructions may be provided via a screen, speaker, or some other output device. For example, the instructions may include graphical data and audio data that instruct the vehicle operator to not exceed a certain speed that is below the speed limit, such as 40 MPH in a 50 MPH zone.

GPS data may be captured for the vehicle at step 440. GPS data may be captured using one or more positional devices 115 on the vehicle 110, which may include certain functionalities offered by mobile device 120. For example, some mobile devices may offer positional tracking information like that of positional device 115. The GPS data may be captured for one each of several vehicles, for example for a fleet of vehicles. Capturing the data may include receiving satellite signals at positioning device 115, determining a location for the positioning device 115 from the signals, and transmitting location information by way of communications tower 135 to positioning server 140.

The GPS data may be received at the application server at step 450. The GPS data captured at vehicle 110 may be received by application server 155 via network 145 and network server 150. In addition to the GPS signal data, the GPS data transmitted from vehicle 110 to, ultimately, application 160 may also include the calculated location, heading and speed of positioning device 115 on the vehicle 110. Vehicle identification information, positional device identification, and a time stamp for when the data was collected may also be transmitted as GPS data to application server 155.

The speed of the vehicle is determined at step 460. The speed of the vehicle may be determined by a series of received GPS data entries associated with the vehicle over time.

A determination is then made as to whether the vehicle behavior complies with the instructions at step 470. The determination may include if the detected vehicle behavior complies with instructions to not exceed a maximum speed, take a particular route, or other instructions regarding vehicle behavior that may be detectable. If a vehicle behavior does not comply with the instructions, an alert is generated based on the vehicle behavior at step 480. The alert may indicate the vehicle identifier, driver, instructions sent, and the detected behavior of the vehicle The alert could be in-cab (provided directly to the driver) or be communicated to the application server to be sent to the fleet manager, either immediately or at a later time. After generating the alert, or if the vehicle does comply with the instructions, the vehicle behavior and instructions are stored at step 490. The stored data may be used to generate a report with respect to the operator.

The aforementioned steps are not all required to implement the intended benefits of the present invention. For example, if a fleet manager is only concerned with positional information, then a speed calculation may be omitted. As such, one skilled in the art will best understand how to apply the aforementioned methodology to best achieve their needs for fleet manager based vehicle control in the context of a particular operating environment or enterprise.

Figure 5:
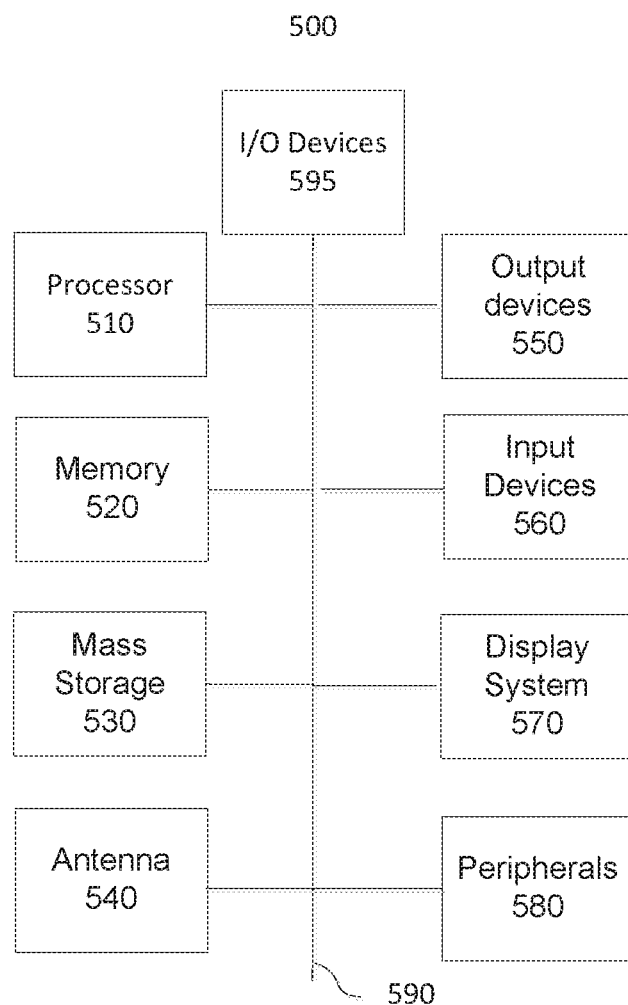
FIG. 5 illustrates an exemplar computing device that may execute one or more embodiments of the invention as disclosed herein.

FIG. 5 illustrates an exemplar computing device 500 that may execute one or more embodiments of the invention as disclosed herein. Computing device 500 of FIG. 1 may be implemented in the contexts of clients and servers, for example. The computing device 500 of FIG. 5 includes one or more processors 510 and memory 520. Memory 520 may store instructions and data such as executable code for execution by processor 510. The computing device 500 of FIG. 5 also includes mass storage 530, antenna 540, output devices 550, user input devices 560, a display system 570, and peripheral devices 580.

The components shown in FIG. 5 are depicted as being connected via a single bus 590. The components may, however, be connected through one or more data transport means and not just a singular bus. For example, processor unit 510 and main memory 520 may be connected via a local microprocessor bus while storage 530, peripheral device(s) 580, and display system 570 may be connected via one or more input/output (I/O) buses.

Mass storage device 530 may include resident mass storage or remote storage as might be accessed over a network connection. Mass storage may be implemented with a magnetic disk drive, an optical disk drive, FLASH memory, or a portable USB data storage device. Mass storage may also be storage arrays maintained remote from various operating aspects of the device 500. Mass storage device 530 can store the system software for implementing embodiments of the present invention by loading that software into main memory 520.

Antenna 540 may include one or more antennas for wirelessly communicating with another device. Antenna 540 may be used, for example, to wirelessly communicate wirelessly via Wi-Fi or an 802.x protocol, Bluetooth, by way of a cellular network, or with other wireless protocols and systems. The one or more antennas may be controlled by a processor that includes a controller to manage the transmission and receipt of wireless signals.

The device 500 as shown in FIG. 5 includes output devices 550 and input devices 560. Examples of output devices include speakers, printers, and monitors. Input devices 560 may include a microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys. Network interfaces may be integrated into output device 550 or input device 560 or some combination of the same. Network interfaces may be used to allow for access to a communications network (wired or wireless) including but not limited to Ethernet or 802.11, which may further utilize the aforementioned antenna system 540.

Display system 570 may include a liquid crystal display (LCD), LED display, or a plasma display. Display system 570 receives textual and graphical information as processed by device 500 to allow for visual depiction of the same. Peripherals 580 in turn may include any type of computer support device to add additional functionality to the device 500 of FIG. 5. For example, peripheral device(s) 580 might include a modem or a router.

The components illustrated in the computing device 500 of FIG. 5 may be found in the context of a desktop computer, a laptop computer, a netbook computer, a tablet computer, a smart phone, a personal data assistant (PDA), a server, or some other computing device that may be suitable for implementing one or more embodiments of the present invention. The computer system 500 of FIG. 5 is therefore intended to include different bus configurations, network platforms, multi-processor platforms, and operating systems including but not limited to Unix, Linux, Windows, Macintosh OS, Palm OS, Android OS, and Apple iOS.

Figure 6:
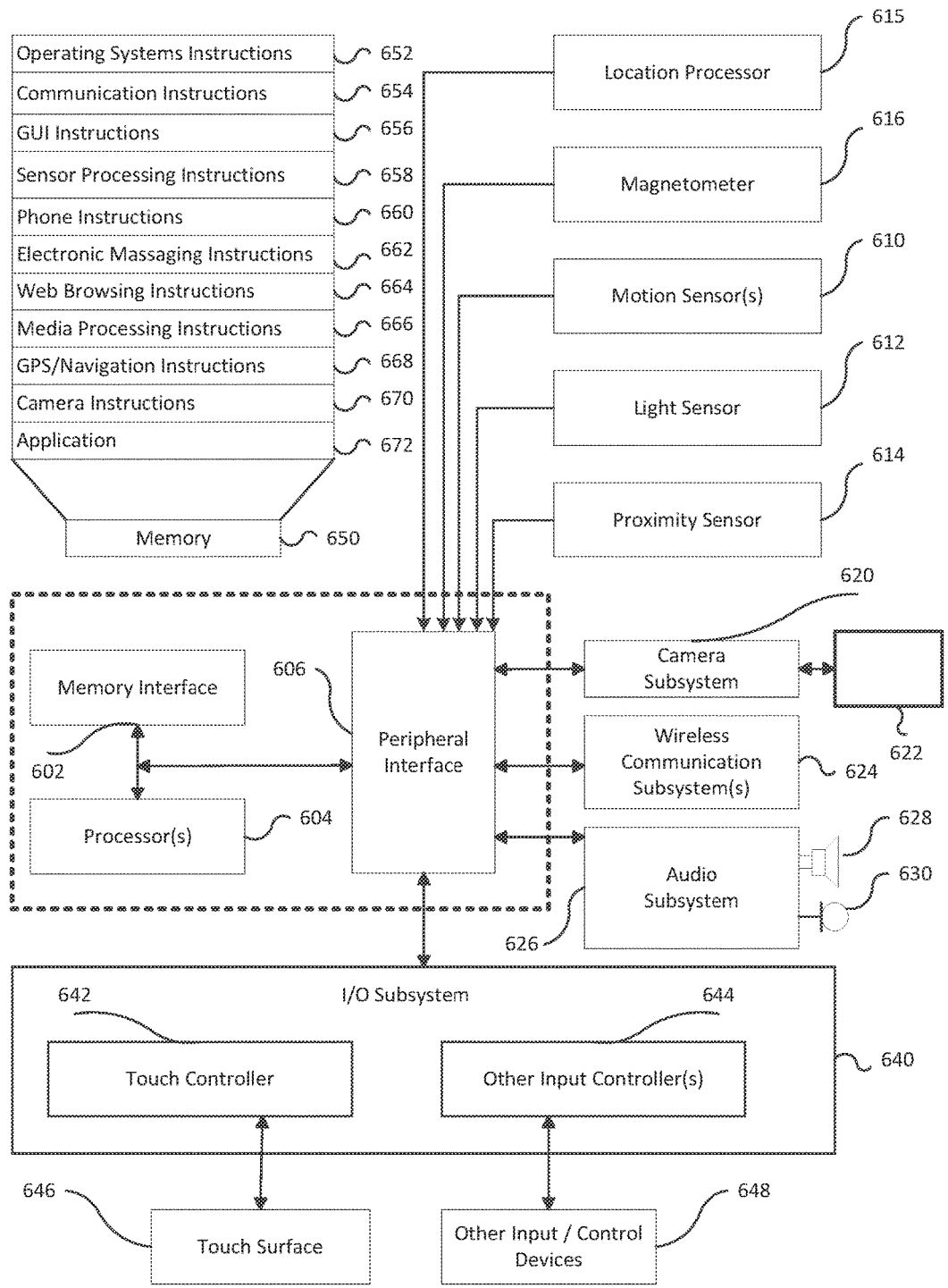
FIG. 6 is a block diagram of an exemplar mobile device that may execute one or more embodiments of the invention as disclosed herein.

FIG. 6 is a block diagram of an exemplar mobile device 600 that may execute one or more embodiments of the invention as disclosed herein. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voice printing and voice authentication.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™. The computing device 600 can, therefore, include a 36-pin connector that is compatible with other devices like an iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement one or more of the features described above.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store other software instructions 672 to facilitate other processes and functions as described above.

The memory 650 can also store other software instructions (not shown. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) 674 or similar hardware identifier can also be stored in memory 650.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

Embodiments of the invention may be implemented on any computing device, including mobile devices such as Apple iPhones, Android phones, or any mobile electronic device with a touch screen. In the preferred embodiment of the invention, the selection boxes depicted in the figures are displayed on a touch screen. In certain instances one or more of the selection boxes may be a physical button on the client device The foregoing detailed description has been presented for purposes of illustration and description. It is not intended to be exhaustive or limiting unless expressly stated to the contrary. Modifications and variations are possible in light of the above teachings that otherwise best explain the principles of the present invention and its practical application. The scope of the present invention is otherwise intended to be limited only by the claims appended hereto.

What is claimed is:

1. A system for vehicle control, the system comprising:
a positioning receiver that identifies a first location of a vehicle and that later identifies a second location of the vehicle;
a memory that stores information that corresponds to a first geographic area comprising a first plurality of thoroughfares;
a communication transceiver that receives a message from a server, the message identifying a second geographic area comprising a second plurality of thoroughfares, wherein the second geographic area is within the first geographic area and the second plurality of thoroughfares are included among the first plurality of thoroughfares; and
a processor coupled to the memory, wherein the processor executes instructions also stored in the memory, wherein execution of the instructions causes the processor to:
identify a destination,
generate a route along a subset of the first plurality of thoroughfares from the first location of the vehicle to the destination, wherein at least a portion of the route is within the second geographic area, and
identify, based on the second location of the vehicle, that the vehicle has failed to avoid the second geographic area; and
an output device that outputs an alert automatically in response to identifying that the vehicle has failed to avoid the second geographic area, the alert providing instructions to an operator regarding control of the vehicle.

2. The system of claim 1, wherein the alert identifies a speed limit.

3. The system of claim 1, wherein the alert identifies a road condition.

4. The system of claim 1, wherein the communication transceiver further transmits a report to the server, the report identifying the vehicle.

5. The system of claim 4, wherein the report also identifies a speed of the vehicle at one or more times along the route.

6. The system of claim 4, wherein the report also includes a timestamp associated with the vehicle having failed to avoid the second geographic area.

7. The system of claim 4, wherein the output device includes a screen, and wherein the alert includes graphical data displayed via the screen.

8. The system of claim 1, wherein the positioning receiver is a global positioning system (GPS) receiver and identifies the first location of the vehicle and the second location of the vehicle based on one or more GPS signals received by the GPS receiver.

9. The system of claim 1, wherein the communication transceiver receives the message via a cellular network.

10. The system of claim 1, wherein execution of the instructions causes the processor to identify a speed of the vehicle based on a plurality of locations of the vehicle, the plurality of locations of the vehicle including at least one of the first location of the vehicle and the second location of the vehicle.

11. The system of claim 1, output device includes a speaker, and wherein the alert includes audio data output via the speaker.

12. The system of claim 1, wherein the alert identifies a structure within the second geographic area.

13. A method for vehicle control, the method comprising:
identifying a first location of a vehicle via a positioning receiver;
storing information corresponding to a first plurality of thoroughfares in a memory;
receiving a message from a server, the message identifying a geographic area that includes a second plurality of thoroughfares, wherein the second plurality of thoroughfares are included among the first plurality of thoroughfares;

identifying a destination;

generating a route along a subset of the first plurality of thoroughfares from the first location of the vehicle to the destination, wherein at least a portion of the route is within the geographic area;

identifying a second location of the vehicle via the positioning receiver;

identifying, based on the second location of the vehicle, that the vehicle has failed to avoid the geographic area; and outputting an alert automatically in response to identifying that the vehicle has failed to avoid the geographic area, the alert indicating that the second location of the vehicle is in the geographic area and providing instructions to an operator regarding control of the vehicle.

14. The method of claim 13, wherein the alert identifies a speed limit.

15. The method of claim 13, further comprising transmitting a report to the server, the report identifying both the vehicle and the operator.

* * * * *